United States Patent
Rosenkilde et al.

(10) Patent No.: US 11,655,914 B2
(45) Date of Patent: May 23, 2023

(54) METHOD AND APPARATUS FOR REDUCING LIQUID PRESSURE

(71) Applicant: Equinor Energy AS, Stavanger (NO)

(72) Inventors: Christian Rosenkilde, Porsgrunn (NO); Patrick Benjamin Müller, Porsgrunn (NO)

(73) Assignee: Equinor Energy AS, Stavanger (NO)

( * ) Notice: Subject to any disclaimer, the term of this patent is extended or adjusted under 35 U.S.C. 154(b) by 1093 days.

(21) Appl. No.: 16/336,637

(22) PCT Filed: Sep. 26, 2017

(86) PCT No.: PCT/NO2017/050247
§ 371 (c)(1),
(2) Date: Mar. 26, 2019

(87) PCT Pub. No.: WO2018/056839
PCT Pub. Date: Mar. 29, 2018

(65) Prior Publication Data
US 2021/0222796 A1    Jul. 22, 2021

(30) Foreign Application Priority Data

Sep. 26, 2016 (GB) .................................. 1616302.4

(51) Int. Cl.
*B01F 25/452* (2022.01)
*F16K 47/08* (2006.01)
(Continued)

(52) U.S. Cl.
CPC .......... *F16K 47/08* (2013.01); *B01F 25/4524* (2022.01); *E21B 21/106* (2013.01); *E21B 43/16* (2013.01); *B01F 2101/505* (2022.01)

(58) Field of Classification Search
CPC .................................................... B01F 25/4524
(Continued)

(56) References Cited

U.S. PATENT DOCUMENTS 1,980,085 A * 11/1934 Perry ........................ F23Q 9/00
  431/278
2,601,616 A * 6/1952 Kasten ................... B01D 35/02
  138/46

(Continued)

FOREIGN PATENT DOCUMENTS

CN   1299917 A   6/2001
CN   2606797 Y   3/2004
(Continued)

OTHER PUBLICATIONS

Feb. 20, 2021—(CN) Office Action—App 201780073285.3—Eng Tran.
(Continued)

*Primary Examiner* — David L Sorkin
(74) *Attorney, Agent, or Firm* — Banner & Witcoff, Ltd.

(57) ABSTRACT

A method of reducing the pressure of a liquid includes the steps of providing a conduit containing a packing material, such that a large number of small passages are formed in the packing material, and passing the liquid through the conduit and the packing material. The amount of packing material through which the liquid flows can be varied to vary the pressure drop experienced by the liquid passing through the packing material. The reduction in pressure achieved may be stepwise (discrete) or continuous. The method may be used to reduce the pressure of an aqueous polymer solution for use in a polymer flood technique for oil extraction, and allows the pressure to be reduced without damage to the polymer.

6 Claims, 3 Drawing Sheets

(51) Int. Cl.
*E21B 21/10* (2006.01)
*E21B 43/16* (2006.01)
*B01F 101/00* (2022.01)

(58) Field of Classification Search
USPC .................. 138/43, 45, 46; 366/182.4
See application file for complete search history.

(56) References Cited

U.S. PATENT DOCUMENTS

| | | | | |
|---|---|---|---|---|
| 2,887,129 A | * | 5/1959 | Stear | G05D 16/0613 |
| | | | | 138/43 |
| 3,168,111 A | * | 2/1965 | Strauss | F16K 47/14 |
| | | | | 137/625.3 |
| 3,219,483 A | * | 11/1965 | Goos | C13K 1/06 |
| | | | | 366/601 |
| 3,292,897 A | * | 12/1966 | McClelland | F16K 17/00 |
| | | | | 251/368 |
| 3,371,714 A | | 3/1968 | Katzer | |
| 3,439,713 A | | 4/1969 | Katzer | |
| 3,477,467 A | | 11/1969 | Sewell et al. | |
| 3,514,074 A | * | 5/1970 | Self | F16L 55/02781 |
| | | | | 138/42 |
| 3,548,880 A | * | 12/1970 | Katzer | C08J 3/00 |
| | | | | 138/43 |
| 3,802,537 A | * | 4/1974 | White | F01N 1/08 |
| | | | | 137/625.3 |
| 4,127,146 A | | 11/1978 | Self | |
| 4,276,904 A | | 7/1981 | Jackson | |
| 4,315,431 A | * | 2/1982 | Hawk | G01F 5/00 |
| | | | | 73/203 |
| 4,375,228 A | * | 3/1983 | Widdowson | F16K 31/363 |
| | | | | 137/503 |
| 4,510,993 A | | 4/1985 | Luetzelschwab | |
| 5,938,328 A | | 8/1999 | Pinto et al. | |
| 7,980,265 B2 | * | 7/2011 | Holmes | E21B 43/12 |
| | | | | 137/467.5 |
| 2012/0205098 A1 | | 8/2012 | Seewald | |
| 2012/0292029 A1 | | 11/2012 | Soucy | |
| 2013/0247995 A1 | | 9/2013 | Ehrlich | |

FOREIGN PATENT DOCUMENTS

| | | |
|---|---|---|
| CN | 101522728 A | 9/2009 |
| CN | 103498645 A | 1/2014 |
| DE | 10332262 A1 | 2/2004 |
| WO | 8801905 A1 | 3/1988 |

OTHER PUBLICATIONS

Feb. 6, 2017—(IPO) Combined Search and Examination Report—Appln GB1616302.4.
Jul. 14, 2017—(IPO) Search and Examination Report—Appln GB1616302.4.
Oct. 29, 2018—(IPO) Examination Report—Appln GB1616302.4.
Dec. 7, 2017—ISR—PCT/NO2017/050247.
Dec. 7, 2017—WO—PCT/NO2017/050247.

* cited by examiner

METHOD AND APPARATUS FOR REDUCING LIQUID PRESSURE

The present application is a U.S. National Phase of International Application No. PCT/NO2017/050247, filed on Sep. 26, 2017, designating the United States of America, and claims priority to British Patent Application No. 1616302.4, filed Sep. 26, 2016. This application claims priority to and the benefit of the above-identified applications, each of which is fully incorporated by reference herein.

The invention relates to a method and apparatus for reducing the pressure of a liquid, and more particularly to a method and apparatus device which can reduce the pressure of liquids without causing physical degradation.

Crude oil is a limited resource and thus it is important to maximise its recovery from existing oil reservoirs. Conventional recovery methods include primary production and secondary water flooding; however, these result in a significant quantity of crude oil remaining in the reservoir. Enhanced oil recovery (EOR), also known as tertiary recovery, refers to various techniques for increasing the amount of crude oil that can be extracted from an oil reservoir. Such techniques include thermal recovery, gas injection and chemical injection. Using EOR, 30 to 60% or more of a reservoir's original oil can be extracted compared to 20 to 40% using primary and secondary production methods.

Chemical enhanced oil recovery (cEOR) is expected to play a major role in the future of global crude oil production. cEOR methods include the use of polymer floods, in which a combination of materials including a water-soluble polymer is injected into the reservoir, typically in a brine solution. The precise nature of the polymer is generally not relevant, provided this can increase the viscosity of the injected water.

Polymer flooding is a well-known technique which has been used for many years. It can result in a significant increase in oil recovery compared to conventional water flooding techniques and is now considered to be technically and commercially proven. Compared to other EOR methods, it is simple, cost effective, low risk and has the advantage that it can be used over a wide range of oil reservoir conditions. The effect of polymer flooding is most pronounced for heavy oils, but reservoirs with light oils can also benefit from polymer flooding, especially when these suffer from severe reservoir heterogeneity.

In polymer flood techniques, a high molecular weight polymer is dissolved in the injected water (typically in an amount ranging from 500 to 2,500 ppm) to increase its viscosity and to increase the sweep efficiency in the reservoir. When water is injected into an oil reservoir it finds the path of least resistance. Where the remaining oil has a higher viscosity than the injected water, the water will finger through this oil and effectively bypass it (this is known as the "fingering effect"). This results in low sweep efficiency and a loss in recovery of oil. By decreasing the mobility ratio between the water and oil, sweep efficiency is enhanced. This results in a higher recovery of oil from the reservoir.

Polymers known for use in polymer flooding are generally categorised into two types: polyacrylamides and polysaccharides (biopolymers). The choice of polymer depends on field characteristics such as reservoir conditions (pH, temperature and pressure) and water chemistry. The most widespread polymer flood technique uses acrylamide-based polymers, for example hydrolysed polyacrylamide (HPAM); these are much cheaper than polysaccharides and not affected by bacteria. Examples of acrylamide-based polymers which are used in enhanced oil recovery are those sold under the trade name Flopaam® by SNF Floerger.

In order to carry out polymer flood, it is of course necessary to introduce the polymer into the reservoir. The polymer (more accurately, a mixture of polymer and water) is pumped from a surface installation (a well-head or a service vessel for a subsea reservoir) down into the reservoir. However, the appropriate pressure of the polymer when it enters the reservoir may not be the same as the output pressure of the pump used to pump the polymer down into the reservoir, and so it is often necessary to reduce the pressure of the polymer (a pressure drop of 15 bar is common).

One way of achieving a pressure drop of this size is by passing the flow through a valve such as a choke valve. Unfortunately, passing a synthetic polymer such as HPAM through a choke valve can cause significant mechanical degradation to the polymer (that is, the long-chain polymer is broken up into shorter chains), as a result of the polymer being subjected to excessive fluid strain. A polymer which has been degraded in this way is less effective in cEOR, and so this must be compensated for by adding more polymer, which can lead to the cEOR process becoming uneconomical.

Low-shear valves are known, which can reduce the pressure of the polymer flowing through them without causing significant mechanical degradation. However, they are normally large and heavy, and this may be impractical for use with an oil reservoir (and in particular a subsea oil reservoir). One known version, disclosed in US 2011/0297399, uses a coiled 100 m length tube, with valves allowing the length of the coiled tube through which the fluid flows to be varied, thus varying the pressure drop. However, even though the tube is coiled, the resulting valve is still too cumbersome for use in certain applications. SNF Floerger's Floquip Linear Pressure Reducer uses a similar arrangement.

For situations involving subsea reservoirs, it would be desirable to pump the mixture of water and polymer from topside in a single pipe, and distribute it between different injection wells. However, this would require the pressure to be adjusted for each injection well, using a separate valve for each well. As mentioned above, choke valves cannot be used as they cause too much degradation of the polymer, and low-shear valves which can achieve the necessary pressure drop are too large for it to be practical to use a single low-shear valve for each well. It would also be possible to provide a separate pipe from the pump to each injection well, but this is a much more expensive solution.

For situations involving land-based reservoirs, in order to avoid degradation, dedicated low-shear pumps have to be installed on each well head, downstream of any choke valves, in order to inject polymer solution into each well. It would be preferable to have a single dedicated high-pressure pump for concentrated polymer solution (so-called "mother solution"), and to distribute this mother solution between the injection wells (mixing it with water to provide the necessary dilute polymer solution), but again this would require low-shear valves.

In order to distribute the polymer between injection wells, it has been found that a pressure drop of up to 30 bar is required, with little or no degradation of the polymer.

One way of achieving this is to provide a series of valves, each of which provides a relatively small pressure drop with low degradation. However, the pressure drop in each valve must be very low (possibly less than 1 bar) in order to achieve low overall degradation, and so this arrangement may end up requiring an impractically large number of expensive valves arranged in series.

Surprisingly, it has been found that a pressure drop of several bar can be achieved, with very little or no degradation, by passing the polymer solution through a relatively short distance of the packing material of a packed bed static mixer, or a similar structured packing material.

Packed bed static mixers are known in themselves (see, for example, U.S. Pat. No. 5,938,328). In a packed bed static mixer, a packing material (which may be granular, in the form of small balls, or similar) is packed into a pipe, so that a large number of small passages are formed between the pieces of packing material. Similar results can be achieved through the use of a structured packing material, which may take the form of a stack of plates or lamina with a large number of small passages defined between the plates. Mixing takes place as a result of the flow of fluids through these small passages, and the mixer has no moving parts.

The invention is based on this surprising observation, and uses the pressure drop in a packed bed or a structured packing material to reduce the pressure of the polymer solution to a desired level while substantially avoiding degradation of the polymer solution. Further, the invention can also provide a pressure reducing device which can apply a variable pressure drop to liquid flowing through it.

According to a first aspect of the present invention, there is provided a method of reducing the pressure of a liquid, comprising the steps of: providing a conduit containing a packing material, such that a large number of small passages are formed in the packing material; and passing the liquid through the conduit and the packing material contained within the conduit; wherein the amount of packing material through which the liquid flows can be varied to vary the pressure drop experienced by the liquid passing through the packing material; and wherein the amount of packing material through which the liquid flows is varied by diverting the liquid out of the conduit at a point selected to provide a desired pressure drop.

The invention uses the fact that that a pressure drop of several bar can be achieved by passing a liquid through the packing material of a packed bed static mixer, or a similar structured packing material. By varying the amount of packing material through which the liquid flows, the actual pressure drop achieved can be varied.

Since the amount of packing material through which the liquid flows is varied by diverting the liquid out of the conduit at a point selected to provide a desired pressure drop, a single conduit can be used, simplifying construction.

In one form, the liquid can be diverted from a conduit at one of a number of points, so as to provide a pressure drop selected from a discrete range of alternatives. In other words, the liquid can be bled off from the conduit at one of several selected points. As the amount of packing material though which the liquid has flowed differs for each point, an appropriate pressure drop can be achieved simply by choosing an appropriate point to bleed the liquid off.

Such an arrangement only allows a choice of pressure drop from a limited number of discrete options. This may not be acceptable in situations where the pressure drop which the liquid undergoes must be very accurate.

Accordingly, in an alternative form, the point at which the liquid is diverted from the conduit can be continuously varied. This allows the achieved pressure drop to be matched more accurately to the desired pressure drop.

In a preferred form of the above methods, the liquid is a polymer solution, more particularly a solution of hydrolysed polyacrylamide.

As was mentioned above, the use of packing material allows the pressure of polymer solution (and particularly HPAM solution) to be reduced with no (or negligible) degradation.

According to a second aspect of the present invention, there is provided a pressure reducing device, including: a conduit, a first region of which is filled with packing material, such that a large number of small passages are formed in the packing material, and a second region of which contains no packing material; a liquid duct in fluid communication with the conduit along its length, the liquid duct having an inlet and an outlet, the inlet being nearer the second region; and means for blocking the duct to prevent the flow of liquid along the duct; wherein the means for blocking the duct can be moved along the duct to vary an amount of packing material through which the liquid is directed.

Liquid entering the pressure reducing device through the inlet flows along the liquid duct until it reaches the means for blocking the duct. Since the duct is in fluid communication with the conduit, the liquid flows into the conduit, and flows through both regions, including the region with the packing material. As a result of this flowing through the packing material, the pressure of the liquid is reduced.

Once the liquid has flowed past the means for blocking the duct, it flows back into the duct, and then out of the device through the outlet. The amount of the packing material through which the liquid flows, and thus the pressure drop which the liquid experiences, can be varied by moving the means for blocking the duct along the duct.

Any suitable means can be used for blocking the duct. However, it is preferred for the means for blocking the duct to be a piston slidably disposed within the duct.

The piston can be moved by any suitable means. However, in a preferred form, means for moving the piston extend along the duct.

In a preferred form, the chamber is in the form of a tube, and the duct is in the form of a pipe disposed within the tube and coaxial therewith. This provides a compact arrangement for the device.

Preferably, the pipe which forms the duct is perforated, so that liquid can flow from the pipe into the tube and vice versa. The perforations preferably extend along the entire length of the pipe, so that liquid can flow between the pipe and the tube at any point along the length of the pipe.

Preferably, the liquid whose pressure is being reduced by the pressure reducing device is a polymer solution, more particularly a solution of hydrolysed polyacrylamide.

Preferred embodiments of the invention will now be described by way of example only and with reference to the accompanying drawings, in which.

Figure 1:
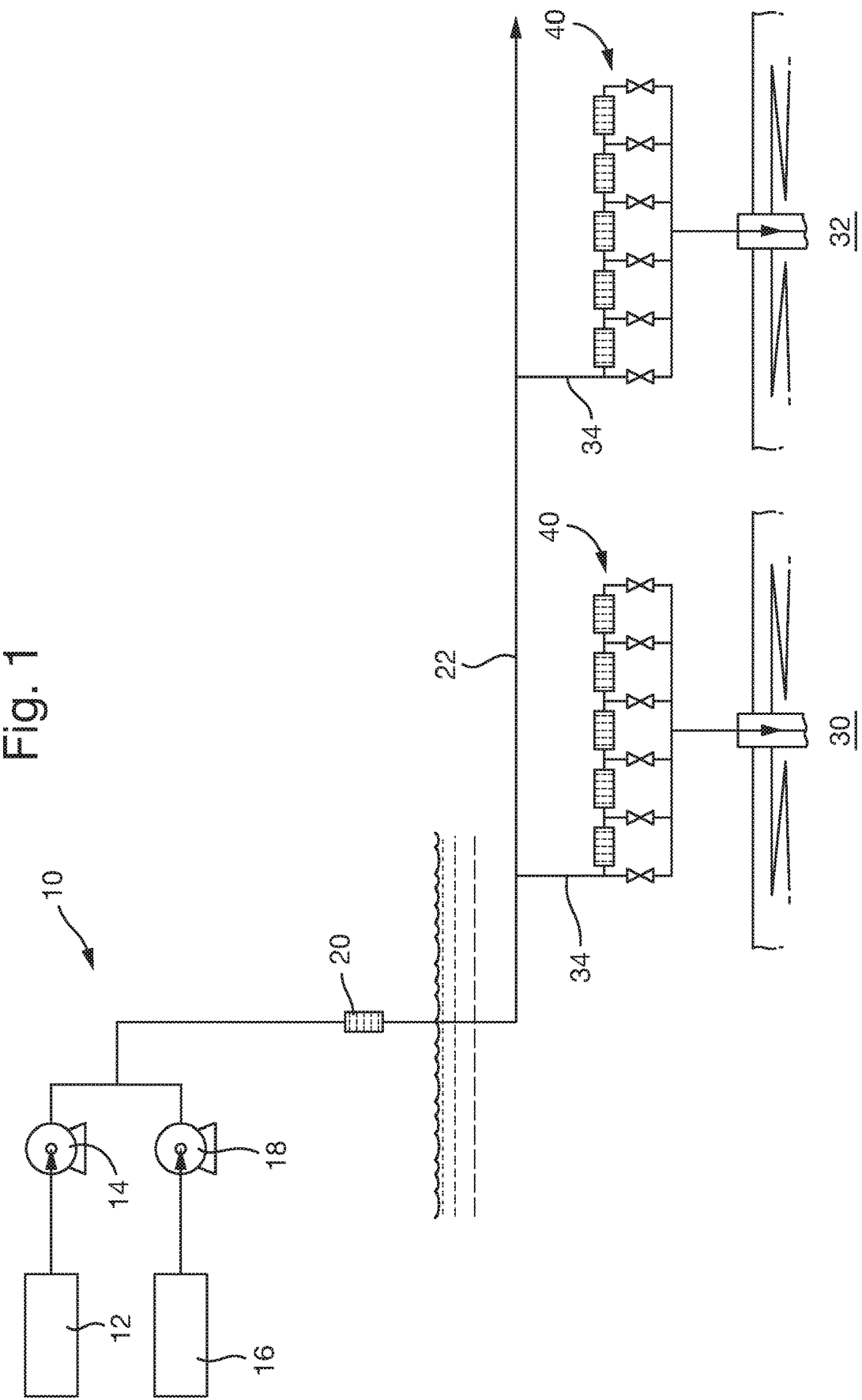
FIG. 1 is a schematic view of an arrangement for introducing polymer solution from a single source into multiple subsea wells.

FIG. 1 shows an arrangement in which water and polymer are mixed to form a polymer solution for use in a polymer flood process at a surface installation 10. The polymer solution is pumped to a number of subsea wells 30, 32 and is injected into the wells. Each well 30, 32 is provided with a device 40 for reducing the pressure of the polymer solution to an appropriate level for the well 30, 32 and these devices will be described later.

Water for injection 12 is supplied to a centrifugal pump 14, and a concentrated polymer solution (at around 10,000 ppm) 16 is supplied to a low shear high-pressure pump 18. As shown in FIG. 1, the outputs of these pumps 14, 18 are mixed together, and this mixture may be passed through a static mixer 20 to ensure proper mixing. The pumps 14, 18 (and the static mixer 20, if one is used) are located at a surface installation.

The dilute polymer solution is then pumped to subsea injection wells 30, 32. As shown in FIG. 1, the dilute polymer solution flows along a single pipe 22 which extends past the subsea injection wells 30, 32, and each well is connected to the pipe by a branch pipe 34. FIG. 1 only shows two wells 30, 32, but it will be appreciated that the arrangement can be used for more than two wells.

Figure 2:
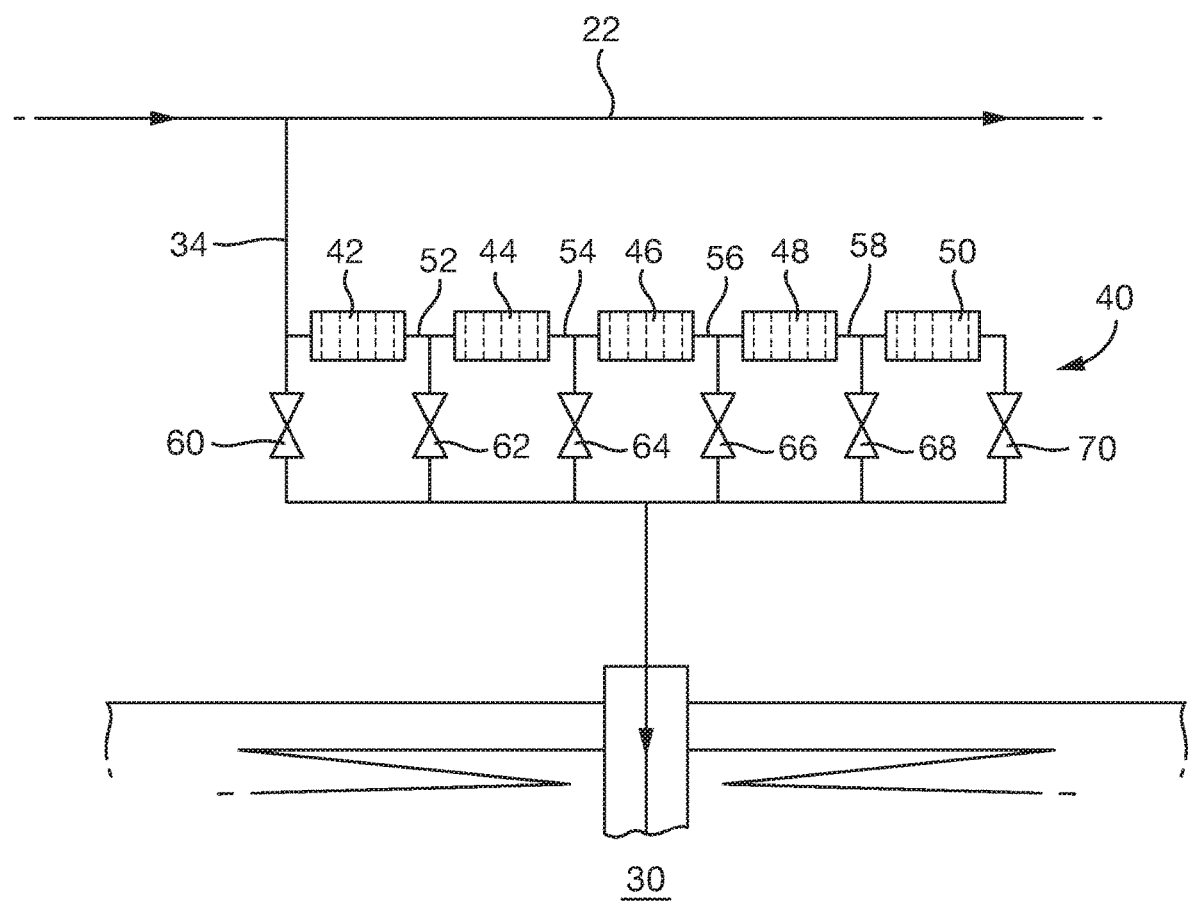
FIG. 2 is an enlarged view of a pressure reducing device used in the arrangement of FIG. 1.

At the end of the branch pipe 34 nearer the well 30, 32, there is provided a device 40 for reducing the pressure of the dilute polymer solution, shown in more detail in FIG. 2. The device consists of a plurality of (in this case, five) separate pressure reducers 42, 44, 46, 48, 50. Each pressure reducer contains a packed bed or structured packing material, such the pressure of the dilute polymer solution is reduced as it flows through the pressure reducer. In a preferred form, the pressure of the dilute polymer solution is reduced by around 5 bar by flowing through the pressure reducer.

The pressure reducers 42-50 are connected to each other by joint pipes 52, 54, 56, 58, so that the dilute polymer solution can flow from the branch pipe 34 into the first pressure reducer 42, from the first pressure reducer 42 into the second pressure reducer 44, and so on.

Further, a plurality of (in this case, six) valves 60, 62, 64, 66, 68, 70 are provided to control the flow of the dilute polymer solution through the pressure reducers 42-50. A first valve 60 is located in a pipe between the branch pipe 34 and the well 30; a second valve 62 is located between the joint pipe 52 which joins the first and second pressure reducers 42, 44 and the well 30; a third valve 64 is located between the joint pipe 54 which joins the second and third pressure reducers 44, 46 and the well 30; a fourth valve 66 is located between the joint pipe 56 which joins the third and fourth pressure reducers 46, 48 and the well 30; a fifth valve 68 is located between the joint pipe 58 which joins the fourth and fifth pressure reducers 48, 50 and the well 30; and a sixth valve 70 is located in a pipe 72 which joins the outlet of the fifth pressure reducer 50 and the well 30.

Each of the valves 60-70 can be controlled so as to be open (allowing flow therethrough) or closed (preventing flow therethrough). By controlling the valves 60-70, the number of pressure reducers through which the dilute polymer solution must flow to reach the well 30 can be changed, and thus the overall pressure reduction can be controlled.

For example, if a pressure drop of 15 bar is required, then the dilute polymer solution will need (in the preferred form) to flow through three of the pressure reducers. Thus, the first, second and third valves 60, 62, 64 are all closed, and the fourth valve 66 is opened. The dilute polymer solution cannot flow directly from the branch pipe 34 into the well 30, as the first valve 60 is closed. Similarly, the dilute polymer solution leaving the first pressure reducer 42 (whose pressure has been reduced by 5 bar) cannot flow directly to the well 30, as the second valve is closed 62. The dilute polymer solution can only flow to the well 30 after it has left the third pressure reducer 46, through the open fourth valve 66.

Depending on which of the valves 60-70 is opened, the pressure reduction which the dilute polymer solution undergoes can be varied. If the first valve 60 is opened, then the dilute polymer solution can flow directly from the branch pipe 34 into the well 30, and there is no (or negligible) pressure reduction. If the sixth valve 70 is opened (and all of the other valves 60-68 are closed), then the dilute polymer solution must flow through all five pressure reducers 42-50, and there is a pressure reduction of 25 bar. Pressure reductions of 5 bar, 10 bar, 15 bar and 20 bar can be achieved by opening the second, third, fourth and fifth valves, 62, 64, 66, 68, respectively, and closing the other valves. Thus, the pressure of the dilute polymer solution flowing into the well can be controlled.

Since each well 30, 32 is provided with its own pressure reducing device 40 (including a plurality of separate pressure reducers), the pressure of the dilute polymer solution can be adjusted according to the requirements and characteristics of the particular well. This allows a single source of dilute polymer solution to supply a number of different wells.

This arrangement has been described in the context of supplying dilute polymer solution to a number of separate subsea wells; however, it will be appreciated that the same arrangement can be used to supply wells on land.

This arrangement allows the pressure of the dilute polymer solution to be varied, but only in a discrete manner (that is, it allows the pressure to be selected from a limited number of alternatives). Thus, it is normally necessary to use a dilute polymer solution whose pressure is not ideally suited to the conditions of the well.

If the pressure of the dilute polymer solution can be varied in steps of 5 bar, then the greatest mismatch between the ideal pressure and the actual supplied pressure will be 2.5 bar. For example, if the ideal pressure for the dilute polymer solution is 12.5 bar, then the actual supplied pressure of the dilute polymer solution should be either 10 bar (2.5 bar too low) or 15 bar (2.5 bar too high).

This maximum mismatch could be reduced by providing a larger number of pressure reducers, each of which reduces the pressure by a smaller amount; however, each pressure reducer will require its own valve, and so it is necessary for there to be a trade-off between the cost and complexity of the pressure reducing device and the accuracy of the pressure supplied.

An alternative approach for reducing this maximum mismatch would be to provide means allowing the pressure reduction to be varied continuously, rather than discretely. For example, the first of the pressure reducers, which would normally reduce the pressure of the dilute polymer solution by 5 bar, could be replaced by a device allowing the pressure to be reduced by a selected amount between zero and 5 bar. This would allow the pressure of the dilute polymer solution to be reduced by any amount between zero and 25 bar.

Figure 3:
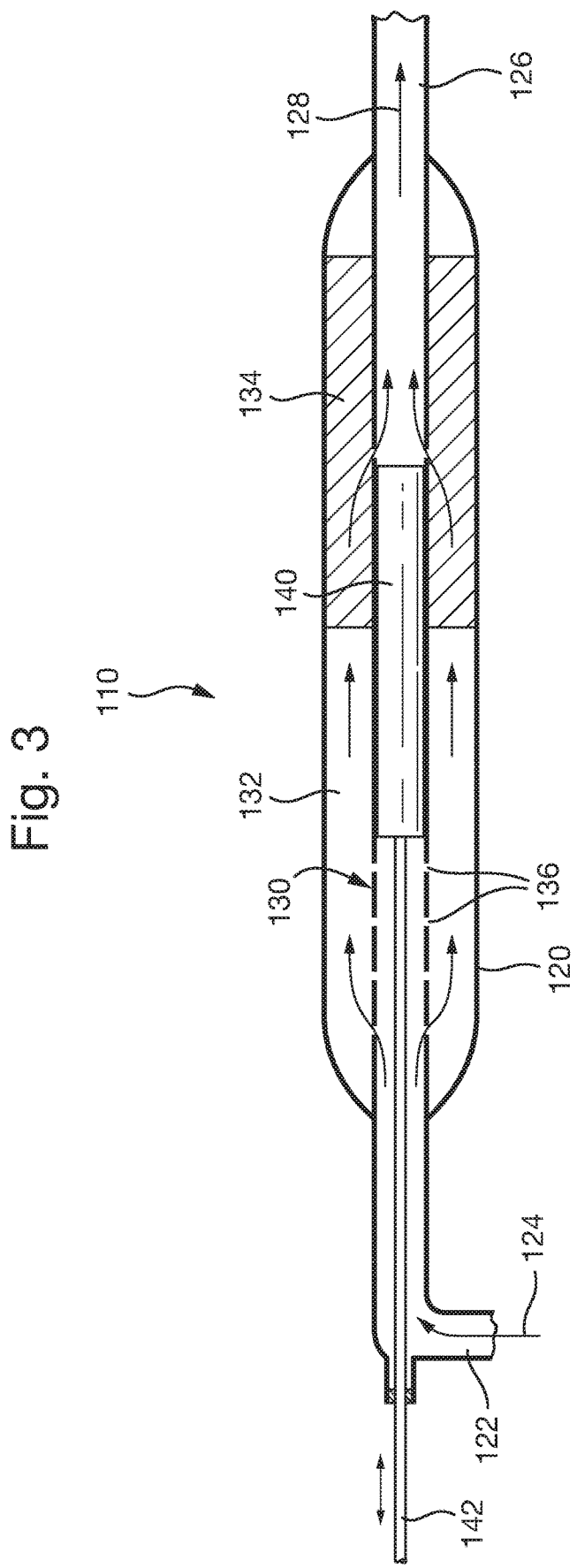
FIG. 3 is a schematic view of an alternative form of pressure reducing device according to a presently preferred embodiment of the invention.

A variable pressure reducing device of this type is shown in FIG. 3. The device shown in FIG. 3 can provide a variable pressure drop for liquid flowing through the device, by varying the distance through which the liquid flows through the packing material. This is achieved by providing a chamber which is partly filled with packing material and partly empty, and varying the amount of packing material through which the liquid flows.

As shown in FIG. 3, the pressure reducing device 110 is generally in the form of a tube 120 with closed ends. Liquid enters the device at an inlet 122 at one end of the device 110 (as shown by arrow 124), flows through the device 110, and exits the device at an outlet 126 at the other end of the device (as shown by arrow 128).

The device 110 includes an inner pipe or duct 130, which extends along the tube 120 in a generally coaxial manner.

The inner pipe 130 has a smaller diameter than the tube 120, so that an annular space or chamber 132 is formed between the inner pipe 130 and the tube 120. The inlet 122 is formed in the inner pipe 130, so that liquid enters the device 110 through the inner pipe 130.

The part of the annular space 132 nearer the outlet 126 is filled with packing material 134, so that there are a large number of small passages formed between the discrete pieces of packing material 134. The use of packing material is not required, and any means of providing a large number of small passages may be used. The part of the annular space 132 nearer the inlet 122 is empty. In a preferred embodiment, around half of the annular space 132 is filled with packing material 134, with the other half being empty.

The inner pipe is perforated (as shown by reference numeral 136), so that liquid can pass between the interior of the inner pipe 130 and the annular space 132. Perforations 136 are preferably formed along the entire length of the inner pipe 130 within the tube 120.

A piston 140 is slidably accommodated within the inner pipe 130, and can be moved axially along the inner pipe 130. Preferably, the axial length of the piston 140 is approximately equal to the axial length of the packed portion of the annular space 132 (and thus, in a preferred form, to the axial length of the empty portion of the annular space 132). The diameter of the piston 140 is almost the same as the inner diameter of the inner pipe 130, so that the piston 140 fits snugly within the inner pipe 130, and liquid cannot flow between the piston 140 and the inner pipe 130.

As shown by arrows in FIG. 3, liquid enters at the inlet 122, and flows along the inner pipe 130 until it reaches the piston 140. Further flow along the inner pipe 130 is prevented by the piston 140, and so the liquid is forced to flow through the perforations 136 in the inner pipe 130 into the empty annular space 132. The liquid flows along the tube 120 in the empty annular space, and then flows into the packing material 134 which is packed into the annular space.

The liquid continues to flow through the packing material 132, until the liquid has flowed past the piston 140, at which point the liquid can flow back through the perforations 136 into the inner pipe 130. The liquid then flows out of the device 110 through the outlet 126.

As a result of flowing through the packing material 132, the liquid undergoes a pressure drop. However, when the liquid is a solution of a polymer such as HPAM, this pressure drop is achieved without degradation of the polymer.

The amount of pressure drop varies depending on how much of the packing material 132 the liquid is forced to flow through, and this can be varied by moving the piston 140 along the axis of the inner pipe 130.

By moving the piston 140 to the left as shown in FIG. 3, the liquid entering the device 110 encounters the piston 140 earlier, and thus is forced into the empty annular space sooner. Further, the liquid passes the piston 140 sooner, and so can also flow out of the packing material 132 sooner. As a result, the liquid flows through more of the empty annular space and less of the packing material 132, which results in a smaller pressure drop.

Similarly, by moving the piston 140 to the right as shown in FIG. 3, the liquid entering the device 110 encounters the piston 140 later, and thus is forced into the empty annular space later. Further, the liquid cannot flow out of the packing material 132 until it has passed through more of the packing material 132. As a result, the liquid flows through less of the empty annular space and more of the packing material 132, which results in an increased pressure drop.

A desired pressure drop can be achieved by moving the piston 140 to an appropriate position, so that the liquid is forced to flow through an appropriate amount of packing material 132.

As shown in FIG. 3, the piston 140 can be connected to a rod 142, which rod 142 extends along the axis of the tube 110 and the inner pipe 120 and passes through a wall of the inner pipe 120. Axial motion of the rod 142 causes axial movement of the piston 140, and this can be used to adjust the pressure drop. Of course, the piston 140 can be moved by any suitable means.

It has been found that a pressure drop of several bar can be achieved by the device, with very low degradation of the polymer. Furthermore, the device is cheap, simple and compact (in comparison to prior art pressure reducing valves discussed above). The variable pressure reducing device of FIG. 3 could be used by itself to generate the desired pressure drop by having a sufficiently long packing material section. Alternatively, the variable pressure reducing device could be used together with one or more pressure reducing devices which reduce the pressure by a fixed amount, as described above.

Alternative arrangements for the variable pressure reducing device can be envisaged. For example, in one alternative arrangement, the inlet and outlet are in communication with the tube, and the inner pipe is half-full of packing material. A ring-shaped piston is disposed in the annular space outside the inner pipe, and can be moved along the tube.

In this alternative arrangement, liquid enters the annular space, is forced through the perforations into the inner pipe by contact with the annular piston, flows through the inner pipe and packing material, and then flows back through the perforations into the tube after it has passed the piston. The liquid then leaves the device through the outlet. The amount of the packing material through which the liquid must flow (and thus the pressure drop which the liquid experiences) can be changed by moving the annular piston along the tube.

In another alternative, the pipes and piston may be circular instead of straight, thereby reducing the total length of the device.

In a further alternative, the rod driving the piston may be partly flexible (for example, a wire guided in a tube). The rod may then be placed alongside the outer pipe 120, to reduce the total length.

It may also be possible to dispense with the inner pipe 130. If the packing material is sufficiently mechanically stable (for example, if it is a sintered product), then a passage can be formed through the material without the need for an inner pipe. This passage can then serve as the duct along which the piston can be moved.

The invention claimed is:
1. A pressure reducing device, including:
   a conduit, a first region of which is filled with packing material, such that a large number of small passages are formed in the packing material, and a second region of which contains no packing material;
   a liquid duct in fluid communication with the conduit along its length, the liquid duct having an inlet and an outlet, the inlet being nearer the second region and the outlet being nearer the first region; and
   means for blocking the duct to prevent the flow of liquid along the duct;
   wherein the means for blocking the duct can be moved along the duct to vary a distance through which the liquid is directed through the packing material between the inlet and the outlet, thereby varying a pressure drop experienced by the liquid passing through the packing material.

2. A pressure reducing device as claimed in claim 1, wherein the means for blocking the duct is a piston slidably disposed within the duct.

3. A pressure reducing device as claimed in claim 2, wherein means for moving the piston extend along the duct.

4. A pressure reducing device as claimed claim 1, wherein the conduit is in the form of a tube, and the duct is in the form of a pipe disposed within the tube and coaxial therewith.

5. A pressure reducing device as claimed in claim 4, wherein the pipe which forms the duct is perforated, so that liquid can flow from the pipe into the tube and vice versa.

6. A pressure reducing device as claimed in claim 5, wherein perforations extend the full length of the pipe.

* * * * *